United States Patent [19]
McInerney

[11] Patent Number: 4,476,682
[45] Date of Patent: Oct. 16, 1984

[54] TURBOCHARGED INTERNAL COMBUSTION ENGINE HAVING AN ALTITUDE COMPENSATED BOOST CONTROL AND METHOD FOR ITS OPERATION

[75] Inventor: Charles E. McInerney, Rolling Hills Estates, Calif.

[73] Assignee: The Garrett Corporation, Los Angeles, Calif.

[21] Appl. No.: 342,983

[22] Filed: Jan. 26, 1982

[51] Int. Cl.³ .................. F02B 37/12; F02D 23/00
[52] U.S. Cl. .................................................. 60/602
[58] Field of Search .............. 60/600, 601, 602, 603; 123/564

[56] References Cited

U.S. PATENT DOCUMENTS

| | | |
|---|---|---|
| 1,346,564 | 7/1920 | Sherbondy .................. 60/602 X |
| 2,148,230 | 2/1939 | Berger . |
| 2,172,809 | 9/1939 | Schmitt . |
| 2,196,247 | 4/1940 | Browne et al. . |
| 2,305,810 | 12/1942 | Muller . |
| 2,355,759 | 8/1944 | Stokes . |
| 2,417,363 | 3/1947 | Holley .................. 60/602 X |
| 2,447,668 | 8/1949 | Sparrow . |
| 2,491,380 | 12/1949 | Kutzler . |
| 2,500,234 | 3/1950 | Bates . |
| 2,559,623 | 7/1951 | Holmes . |
| 2,645,409 | 7/1953 | Lawler . |
| 3,035,408 | 5/1962 | Silver .................. 60/602 |
| 3,044,683 | 7/1962 | Woollenweber, Jr. . |
| 3,096,614 | 9/1963 | Silver et al. . |
| 3,150,814 | 9/1964 | Evans et al. . |
| 3,233,403 | 2/1966 | MacInnes et al. . |
| 3,389,553 | 6/1968 | Hardy et al. . |
| 3,443,376 | 5/1969 | Light . |
| 3,611,711 | 10/1971 | Mueller . |
| 3,727,399 | 4/1973 | Brille et al. . |
| 3,913,542 | 10/1975 | Uitti et al. . |
| 3,931,712 | 1/1976 | Keller . |
| 3,941,035 | 3/1976 | Mueller . |
| 4,283,912 | 8/1981 | Cholvin .................. 60/602 |

FOREIGN PATENT DOCUMENTS

| | | | |
|---|---|---|---|
| 345304 | 12/1921 | Fed. Rep. of Germany ...... 123/564 |
| 272863 | 10/1927 | United Kingdom ................ 123/564 |
| 313417 | 6/1929 | United Kingdom ................ 123/564 |
| 2077854 | 12/1981 | United Kingdom ................ 60/602 |

Primary Examiner—Michael Koczo
Attorney, Agent, or Firm—Joseph A. Yanny; J. Henry Muetterties; Albert J. Miller

[57] ABSTRACT

A pneumatically controlled altitude compensating boost control for maintaining a constant intake manifold pressure on a turbocharged engine having a wastegate valve for selectively bypassing engine exhaust gas around the turbine. The altitude compensating boost control comprises an altitude compensating bleed valve means which varies the compressor outlet pressure in the control in response to the change in ambient pressure and a wastegate actuator which is responsive to the ambient pressure and the varied compressor outlet pressure.

12 Claims, 3 Drawing Figures

TURBOCHARGED INTERNAL COMBUSTION ENGINE HAVING AN ALTITUDE COMPENSATED BOOST CONTROL AND METHOD FOR ITS OPERATION

BACKGROUND OF THE INVENTION

This invention relates to a control unit responsive to gas pressure and a method of providing control signals. More specifically, this invention relates to an altitude compensating bleed valve and a method for controlling turbine speed for an internal combustion engine.

In a turbocharger system for supplying air under constant pressure to an internal combustion engine, the output of the turbocharger must be adjusted for changes in altitude or density of the gases provided to the turbocharger.

The turbocharger, as a method of pressurizing the air supply to an engine, comprises a centrifugal compressor which is generally driven by a turbine powered by the engine exhaust gases. Normally, as engine speed is increased providing increased exhaust gases, the turbine speed also increases, which in turn operates the compressor at increased speed providing a higher density of air supply to the engine. In order to regulate turbocharger operation, all or a portion of the exhaust gases may be diverted around the turbine. Such a device is commonly called a wastegate bypass valve.

Wastegate bypass valves are well-known in the prior art. Typically, a pressure sensitive device, in response to changes in the output of the compressor (sensed within the compressor or between engine and compressor as either total or static pressure or a value in between), will open and close the wastegate bypass valve through hydraulic or electrical means as a system to prevent turbocharger overspeed. Some turbocharger control systems require manual operation of the throttle to initiate the system or control its use.

Control systems not requiring manual operation that compensate for altitude by adjusting turbocharger speed typically consist of similar complex mechanical and hydraulic sub-systems. These devices compare the turbocharger output with ambient air, the difference providing the input that controls the wastegate.

The present invention overcomes the problems and disadvantages of the prior art by providing an improved and simplified pneumatically controlled wastegate for maintaining a constant intake manifold pressure by varying the turbocharger speed for changes in altitude.

SUMMARY OF THE INVENTION

In accordance with the present invention, a system and method is provided for maintaining a constant intake manifold pressure for varying altitude in a turbocharged internal combustion engine, the system providing an altitude compensating bleed valve that reacts to changes in altitude and a wastegate to regulate turbine speed. The internal combustion engine and turbocharger may be of conventional design.

The bleed valve comprises an evacuated bellows exposed to atmospheric pressure and is located in a manifold intake pressure sensing line. The bellows expands as altitude is increased causing the valve to become more open, releasing pressure from the sensing line to the atmosphere and increasing mass flow through the sensing line. A restriction is provided in the sensing line between the engine and the valve which creates a pressure drop as the mass flow there past increases. This reduced pressure in the sensing line is roughly proportional to the altitude and is communicated to a wastegate control.

The wastegate control comprises a diaphragm enclosed in a chamber with one side of the diaphragm biased to a wall of the chamber by a spring. The diaphragm is opposed by the pressure from the sensing line. Diaphragm movement controls the position of the wastegate valve in an exhaust gas turbine bypass.

In operation, as atmospheric pressure is decreased, the bleed valve causes a greater pressure drop in the sensing line which operates the wastegate, allowing less exhaust gas to bypass the turbine. This allows for greater turbine and compressor speed in order to maintain a constant intake manifold pressure as the atmospheric pressure decreases.

BRIEF DESCRIPTION OF THE DRAWINGS

The accompanying drawings illustrates the invention.

DETAILED DESCRIPTION OF THE PREFERRED EMBODIMENT

Figure 1:
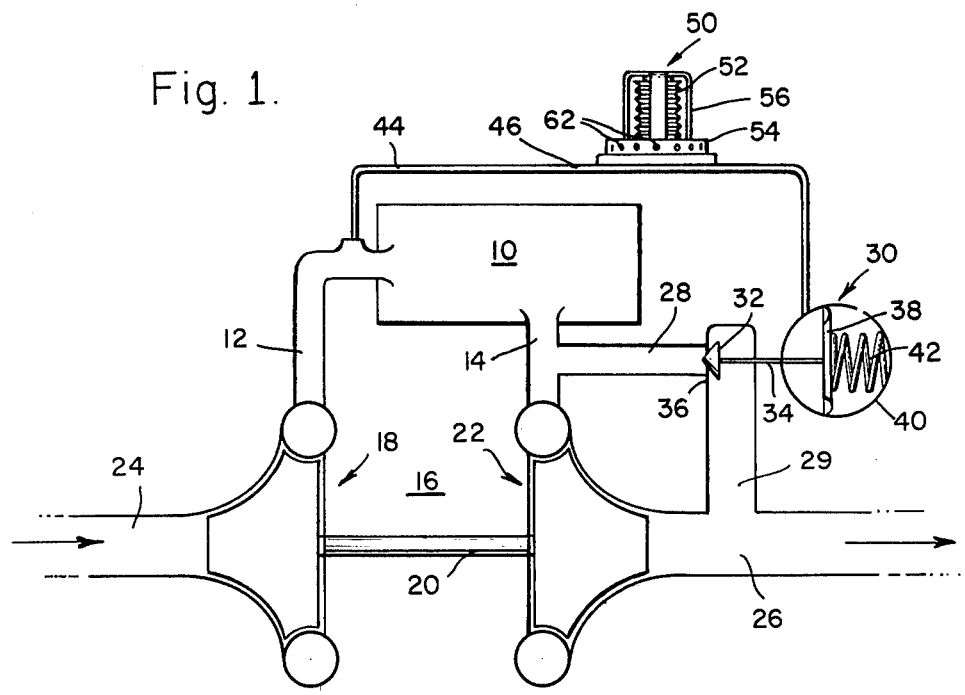
FIG. 1 is a schematic representation of a turbocharging system for an internal combustion engine employing a wastegate control and an altitude compensator according to the present invention.

In the system there is shown an internal combustion engine 10, having an intake conduit 12 and an exhaust conduit 14. A turbocharger is indicated generally at 16 and comprises a compressor 18 connected by an intake conduit 24 leading to the atmosphere. The outlet of the compressor 18 is connected to the engine intake conduit 12. The intake of a turbine 22 is connected to engine exhaust conduit 14 and the outlet of the turbine 22 is connected to exhaust conduit 26 leading to the atmosphere. The compressor 18 and turbine 22 are coaxially mounted for simultaneous rotation on a common shaft 20. A bypass around the turbine 22 is provided by conduits 28 and 29, the passage through which is controlled by a wastegate, indicated generally at 30.

The wastegate 30 includes a poppet 32 mounted at the end of a stem 34 and engaging a valve seat 36 to close the bypass conduits around the turbine. The outer end of the stem 34 is connected to diaphragm 38, movement of which controls the position of the poppet 32. The diaphragm 38 is enclosed in a chamber 40 and attached to the wall of the chamber by any suitable means. An adjustable spring 42 or similar biasing means opposes the movement of the poppet 32 away from its seat. A compressor discharge pressure sensing line 44 or conduit, is connected to the chamber 40 on the side of the diaphragm 38 opposite the spring 42. The wall of the portion of the chamber 40 in which the spring is seated is vented to ambient as shown.

If a sufficiently low compressor discharge pressure is communicated to the diaphragm 38 by the sensing line 44, the poppet 32 will engage the valve seat 36 preventing gas from flowing through the bypass conduits 28 and 29. The pressure which is communicated with the diaphragm may, of course, be static or total with only slight modifications to the system well known to those skilled in the art, being required to accommodate. The operation of the wastegate permits a variable amount of gas to bypass the turbine. The wastegate is variable. As the pressure of the sensing line 44 and against the diaphragm 38 decreases, the poppet correspondingly allows a decreased flow of the exhaust gas through the bypass conduits 28 and 29.

Figure 3:
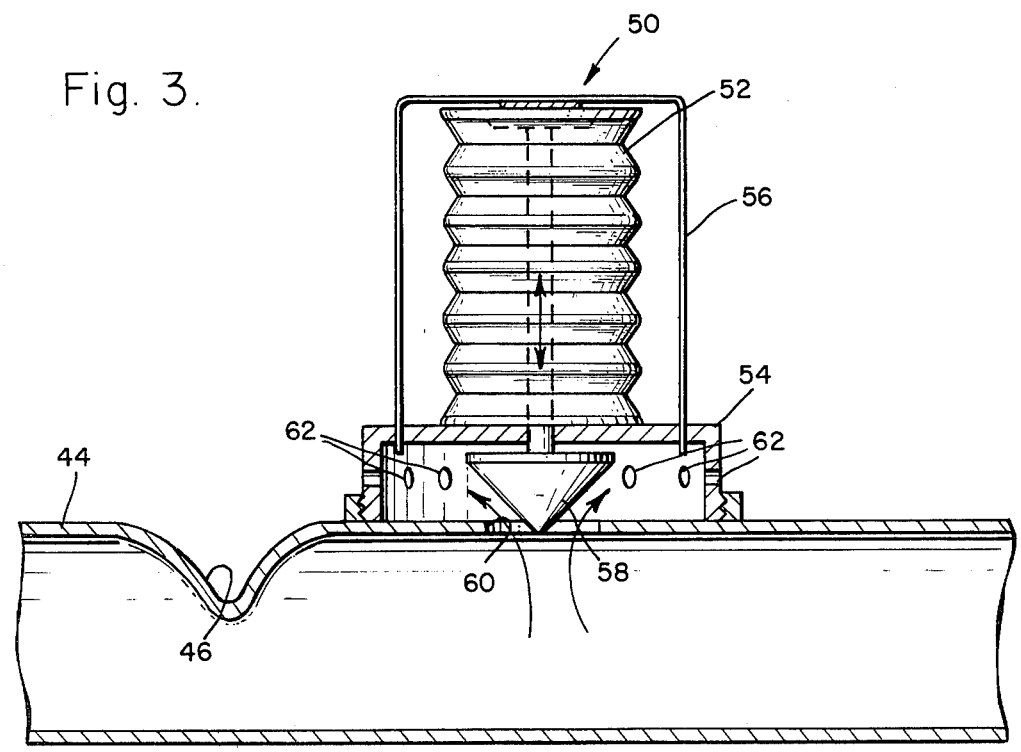
FIG. 3 is a view similar to FIG. 2, but with the valve shown in its open position.
Figure 2:
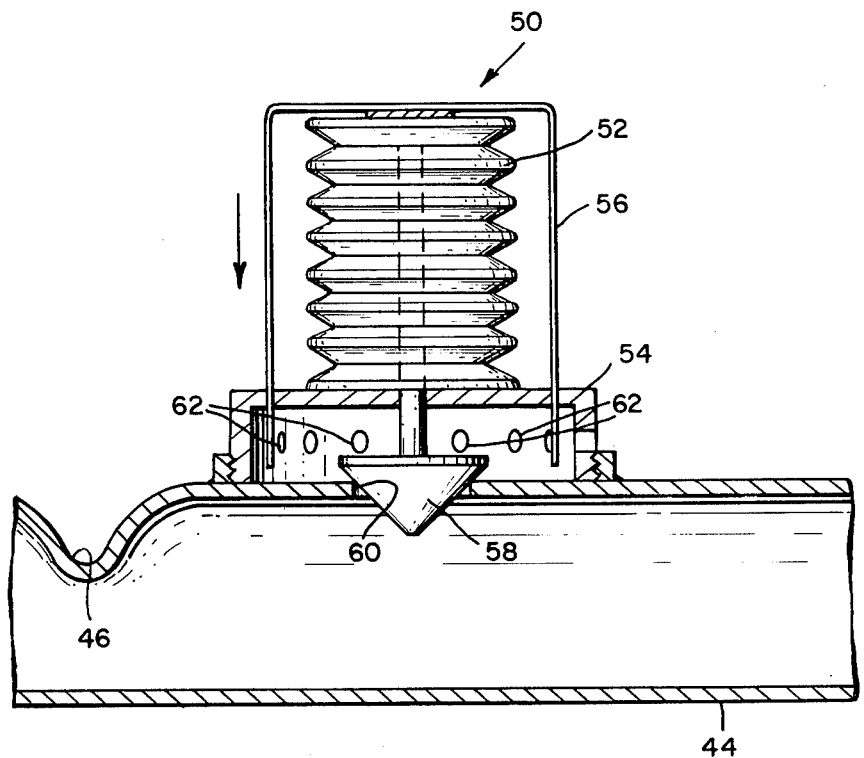
FIG. 2 is an enlarged sectional view of the altitude compensator valve according to the present invention.

An altitude compensator bleed valve, indicated generally at 50 in FIG. 1 and shown in detail in FIGS. 2 and 3, is located in the sensing line 44 between the wastegate 40 and a restriction 46. An evacuated bellows 52 is mounted between a bellows support 54 and a valve support 56. A valve 58 is attached to the valve support 56 and engages the valve seat 60.

The evacuated bellows 52 is exposed to atmospheric pressure, therefore, as altitude is increased the bellows will linearly expand, causing the valve 58 to be displaced from the valve seat 60 as shown in FIG. 2 and moved to an open position as shown in FIG. 3. This allows pressure in the sensing line 44 to be vented to the atmosphere through vent holes 62 in bellows support 54. The amount of expansion of bellows 52 and thus the amount of pressure vented to the atmosphere is proportional to the altitude. As altitude is increased, the valve 58 is displaced further from the valve seat 60 providing an increased pressure release.

It is desirable to maintain a constant absolute pressure in the intake manifold and to the engine 10. The pressure supplied to the engine by the inlet conduit 12 is sensed by line 44. As altitude is increased, flow is vented through the bleed valve 50, causing a pressure drop in the sensing line 44 as the increased mass flow crosses the restriction 46. As pressure drops in the sensing line 44 and against the diaphragm 38, less exhaust is allowed to bypass the turbine 22. Therefore, increased turbine speed is obtained, providing a higher compressor speed. The increased compressor speed, when coupled with the natural decrease in ambient atmospheric pressure, provides a constant pressure in the intake conduit and to the engine 10.

While the turbocharger, engine and wastegate characteristics influence the design of the bleed valve, the following are examples of relative values for the invention as described.

| Altitude Feet | Ambient Pressure In HgA | Compressor Discharge Pressure In HgA | Compressor Discharge Pressure to Wastegate In HgA |
|---|---|---|---|
| Sea Level | 30 | 50 | 50 |
| 5000 | 25 | 50 | 45 |
| 10000 | 20 | 50 | 40 |

| Orifice Area | Bleed Valve Area | Compressor Pressure Ratio |
|---|---|---|
| A | 0 | 1.67 |
| A | .53A | 2.00 |
| A | .79A | 2.50 |

While certain preferred embodiments of the invention have been disclosed, many variations will be readily apparent to those skilled in the art.

Accordingly, no limitation of the invention is intended except by way of the appended claims wherein I claim:

1. An altitude compensating boost control system for maintaining a supply of charge air to a turbocharged internal combustion engine at a constant pressure, including a turbocharger having a compressor housing with an inlet and outlet, and a turbine housing having an inlet and an outlet and a bypass means between said turbine inlet and said turbine outlet for controllably bypassing exhaust gas around said turbine, said system comprising:
   an altitude compensator means sensitive to changes in ambient pressure including a conduit means in communication with said compressor outlet for varying the charge air pressure in said conduit means by an amount in direct proportion to the change in ambient pressure; and
   actuator means responsive to said varied charge air pressure and the ambient pressure for selectively sealing said bypass means.

2. An altitude compensating boost control system for maintaining a supply of charge air to a turbocharged internal engine at a desired pressure including a turbocharger having a compressor with an inlet and an outlet, said compressor being rotatable by an exhaust gas driven turbine, said system comprising:
   conduit means connected to said compressor outlet for sensing the charge air pressure;
   means sensitive to changes in ambient pressure for varying the sensed charge air pressure by an amount approximately equal to the change in the ambient pressure; and
   turbine bypass control means for varying compressor speed in response to said varied sensed pressure and the ambient pressure.

3. The altitude compensating boost control system of claim 2 wherein said means for varying the sensed charge air pressure comprises:
   a restriction in said conduit means, and an altitude compensating means downstream of said restriction.

4. The altitude compensating boost control system of claim 3 wherein the altitude compensating means comprises:
   a valve support;
   a generally cup-shaped bellows support mounted to said conduit and axially aligned over an aperture in said conduit means, said bellows support having at least one aperture vented to the ambient;
   a valve means having a stem attached to said valve support and a valve head attached to said stem, said stem slidable within an aperture in said bellows support; and
   an evacuated bellows attached to said valve support and mounted on said bellows support for selectively moving said valve head to open and close said aperture in said conduit means.

5. A method of maintaining a desired absolute pressure in a turbocharged internal combustion engine including a compressor having an inlet and an outlet and a turbine having an inlet and an outlet and a bypass means between said turbine inlet and outlet for controllably bypassing exhaust gas around said turbine, said method comprising the steps of:
   sensing the compressor outlet pressure;
   varying the sensed compressor outlet pressure by an amount such that the difference between the varied compressor outlet pressure and the ambient pressure remains substantially a constant value;
   communicating the varied pressure to a bypass control means for operating said bypass means in response to the varied pressure and the ambient pressure whereby a constant absolute pressure is supplied to said engine.

6. In a turbocharged internal combustion engine including a compressor having an inlet and an outlet, said compressor outlet being connected to the inlet manifold of said engine for supplying charge air to said engine, a turbine housing having an inlet and an outlet and a bypass passage intermediate said turbine inlet and turbine outlet, the inlet of said turbine housing being connected to the exhaust manifold of said engine for receiving exhaust gases therefrom, a compressor wheel mounted on a shaft in said compressor housing between said compressor inlet and outlet, a turbine wheel mounted on said shaft in said turbine housing between said turbine inlet and said turbine outlet, valve means slidably mounted in the bypass passage in said turbine housing, said valve means controllably sealing said bypass passage, and bypass control means comprising:
  an actuator means having a diaphragm separating said actuator means into a first chamber and a second chamber, said first chamber being vented to the ambient, and a spring means for biasing said valve means to close said bypass passage; and
  an altitude compensating means including a conduit means communicating with said compressor outlet and said second chamber of said actuator means, said conduit means having a bleed hole, and an altitude compensator bleed valve means upstream of said actuator means for variably controlling fluid through said bleed hole to vary the pressure in the second chamber such that the difference between the varied pressure and the ambient pressure remains substantially constant.

7. The bypass control means according to claim 6 wherein said altitude compensating means includes a restriction means upstream of said bleed valve means.

8. The bypass control means according to claim 6 wherein said altitude compensating bleed valve means comprises:
  a valve support;
  a bellows support mounted to said conduit means;
  an evacuated bellows attached to said valve support and mounted on said bellows support; and
  a valve means having a stem attached to said valve support and a valve head attached to said stem for controllably opening and closing said bleed hole in said conduit means.

9. The bleed valve means according to claim 8 wherein said valve support is a generally U-shaped bar with each end slidable within apertures formed in said bellows support.

10. The bypass control means according to claim 6 wherein said altitude compensating bleed valve means comprises:
  a generally cup-shaped bellows support having an open end and a closed end, said open end mounted to said conduit means coaxial with said bleed hole, said closed end having an aperture in the center thereof, said bellows support having at least one aperture therein exposed to the ambient;
  a U-shaped valve support each each end slidable within apertures formed in the closed end of said bellows support;
  an evacuated bellows attached to the valve support and mounted coaxially atop the bellows support;
  and valve means having a stem attached to the valve support and slidable within said aperture in the closed end of said bellows support and a valve head attached to said stem below said closed end of said bellows support for controllably opening and closing said bleed hole in said conduit means.

11. A turbocharger for an internal combustion engine having an inlet manifold and an exhaust manifold, said turborcharger comprising:
  a compressor housing having an inlet opening and an outlet opening, said outlet opening being connected to the inlet manifold of said engine for supplying charger air to said engine;
  a turbine housing having an inlet opening and a outlet opening and a chamber intermediate said inlet and said outlet openings forming a bypass conduit therebetween, the inlet opening of said turbine housing being connected to the exhaust manifold of said engine for receiving exhaust gases therefrom;
  a compressor wheel mounted on said shaft in said compressor housing between said compressor and outlet openings;
  a turbine wheel mounted on said shaft in said turbine housing between said turbine inlet opening and said turbine outlet openings;
  valve means slidably mounted in an opening in said turbine housing, said valve means having a head portion and a stem portion, said head portion forming selective sealing means for said bypass conduit; and
  an altitude compensating bypass control means including a source of control fluid, an altitude compensating bleed valve for varying the pressure of said control fluid, and an actuator means having a flexible wall means separating said actuator means into a first and a second chamber, said wall means attached to said valve means for selectively moving said valve head portion with respect to said bypass conduit, said first chamber being connected to said source of control pressure and said second chamber being vented to ambient.

12. An altitude compensating bypass control means according to claim 11 further comprising a restriction in said source of control fluid upstream of said bleed valve.

* * * * *